United States Patent [19]

Sasaki

[11] Patent Number: 5,761,438

[45] Date of Patent: Jun. 2, 1998

[54] APPARATUS FOR MEASURING THE AMOUNT OF TRAFFIC OF A NETWORK AT A PREDETERMINED TIMING AND COMPRESSING DATA IN THE PACKET WITHOUT CHANGING THE SIZE OF THE PACKET

[75] Inventor: Akitomo Sasaki, Kawasaki, Japan

[73] Assignee: Canon Kabushiki Kaisha, Tokyo, Japan

[21] Appl. No.: 923,981

[22] Filed: Sep. 5, 1997

Related U.S. Application Data

[63] Continuation of Ser. No. 297,820, Aug. 30, 1994, abandoned.

[30] Foreign Application Priority Data

Aug. 31, 1993 [JP] Japan ................. 5-215371

[51] Int. Cl.$^6$ ................................. G06F 13/00
[52] U.S. Cl. ................. 395/200.77; 395/200.54; 395/200.66; 395/200.65; 395/200.62; 340/88; 340/89; 340/200; 370/229; 370/232; 370/235; 382/232; 382/246; 382/239; 382/251
[58] Field of Search .................. 395/675; 340/88, 340/89, 200; 382/246, 239, 251

[56] References Cited

U.S. PATENT DOCUMENTS

| | | | |
|---|---|---|---|
| 4,200,771 | 4/1980 | Kraushaar et al. | 379/138 |
| 4,669,113 | 5/1987 | Ash et al. | 379/221 |
| 4,679,193 | 7/1987 | Jensen et al. | 370/94.1 |
| 4,771,391 | 9/1988 | Blasbalg | 364/514 C |
| 4,841,527 | 6/1989 | Raychaudhuri et al. | 371/32 |
| 4,931,941 | 6/1990 | Krishnan | 364/427 |
| 4,941,144 | 7/1990 | Mizukami | 371/5.5 |
| 5,247,517 | 9/1993 | Ross et al. | 370/85.5 |
| 5,253,078 | 10/1993 | Balkanski et al. | 358/426 |
| 5,276,898 | 1/1994 | Kiel et al. | 395/675 |
| 5,347,524 | 9/1994 | I'Anson et al. | 395/184.01 |
| 5,371,899 | 12/1994 | Kuznicki et al. | 455/34.1 |
| 5,412,780 | 5/1995 | Rushton | 395/250 |
| 5,432,871 | 7/1995 | Novik | 382/232 |

FOREIGN PATENT DOCUMENTS 04-077150  3/1992  Japan .

*Primary Examiner*—Thomas C. Lee
*Assistant Examiner*—Po C. Huang
*Attorney, Agent, or Firm*—Fitzpatrick, Cella, Harper & Scinto

[57] ABSTRACT

In a communication method and apparatus, the load of a network is reduced by compressing data or changing the data compression method in accordance with a busy state of the network. A network's busy-state monitoring unit checks the busy state of the network, and data to be transmitted is compressed or the compression method is changed in accordance with the busy state, so that the amount of transmitted data is reduced, and the load of the network is reduced.

12 Claims, 19 Drawing Sheets

APPARATUS FOR MEASURING THE AMOUNT OF TRAFFIC OF A NETWORK AT A PREDETERMINED TIMING AND COMPRESSING DATA IN THE PACKET WITHOUT CHANGING THE SIZE OF THE PACKET

This application is a continuation of application Ser. No. 08/297,820 filed Aug. 30, 1994, now abandoned.

BACKGROUND OF THE INVENTION

1. Field of the Invention

This invention relates to a communication method and apparatus for communicating data via a network, to which the apparatus is connected.

2. Description of the Related Art

In a conventional information processing apparatus connected to a network, when transmitting data to another apparatus, the data is transmitted without being modified.

Transmitted image data and voice data can be restored using techniques, such as interpolation and the like, even if a part of information is missing. Hence, a large amount of missing data will not be noticed in information received by a person. In consideration of this fact, techniques have been proposed, in which the amount of image data and voice data is reduced by intentionally skipping a part of the data, though the obtained image and voice do not have high quality.

However, the above-described conventional approach has the problem that a large amount of data transmitted when the amount of circulation of data on the network is large greatly hinders transfer of other data on the network.

Another problem is that, even when the amount of other data on the network is so small that the transmission of such image data and voice data does not hinder the data communication on the network, the receiver of the data cannot obtain high-quality images and voice, because the amount of the data is reduced.

SUMMARY OF THE INVENTION

The present invention has been made in consideration of the above-described problems.

It is an object of the present invention to provide an efficient communication method and apparatus, in which it is determined if data must be compressed, or the method of data compression is changed, in accordance with a network's busy state, so as to adjust the load of the network.

It is another object of the present invention to perform efficient control of the compression ratio in data communication.

It is still another object of the present invention to provide a new data communication/compression method.

According to one aspect, the present invention, which achieves these objectives, relates to a communication apparatus, connected to a network, for communicating data via the network, comprising circulation-amount measuring means for measuring an amount of circulation of data to be communicated via the network, compression means for compressing the data to be communicated in accordance with a result of the measurement of the circulation-amount measuring means, and communication means for communicating the data compressed by the compression means.

According to another aspect, the present invention relates to a communication method for communicating data via a network, to which a communication apparatus is connected, comprising the steps of measuring an amount of circulation of data to be communicated via the network, compressing the data to be communicated in accordance with a result of the measurement in the measuring step, and communicating the data compressed in the compression step.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

A first embodiment of the prensent invention will now be described in detail with reference to the drawings.

Figure 1:
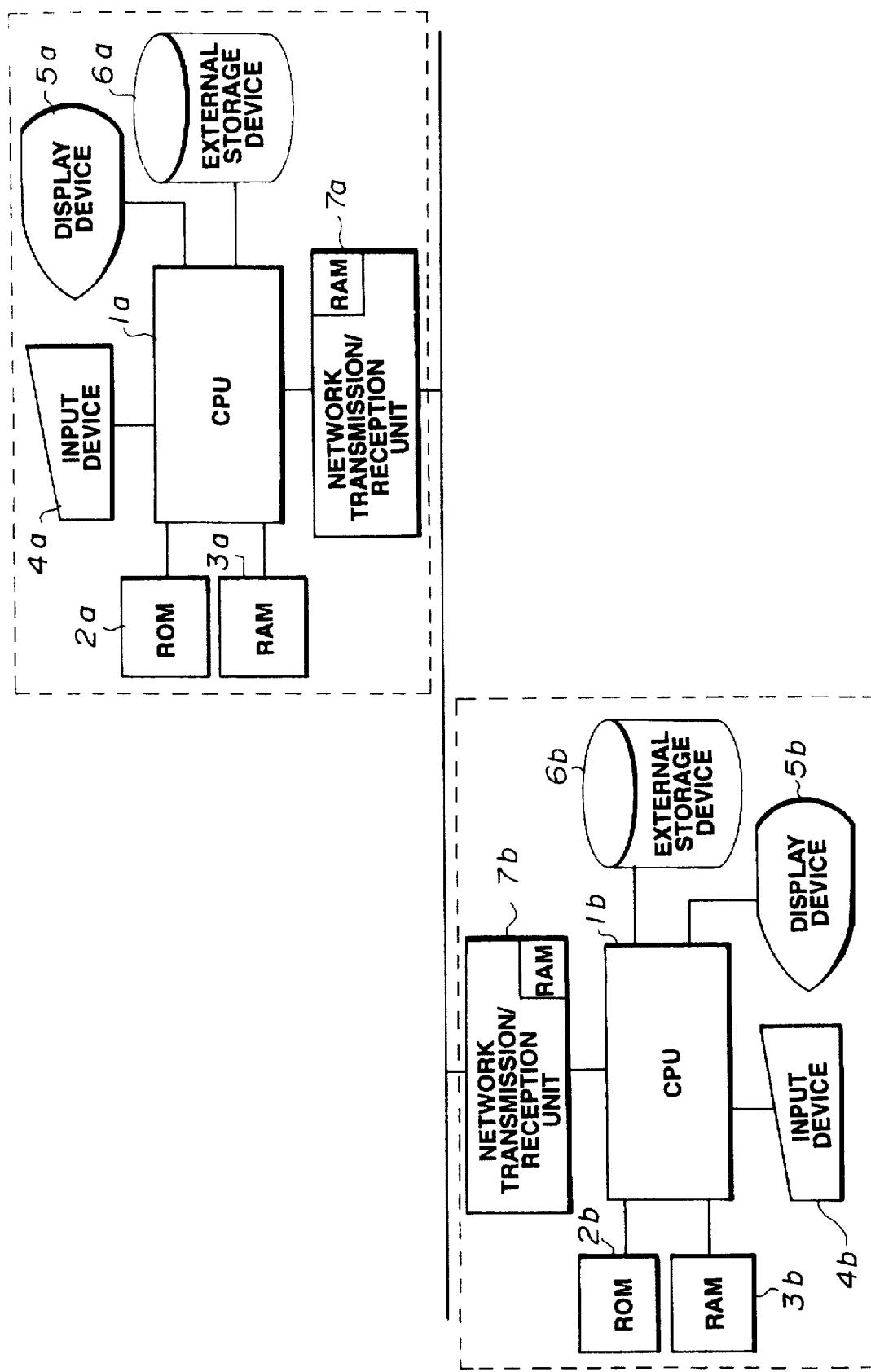
FIG. 1 is a schematic block diagram illustrating the configuration of an information processing apparatus connected to a network.

First, a description will be provided of an outline of the configuration and the operation of information processing apparatuses connected to a network with reference to the schematic block diagram shown in FIG. 1. Information processing apparatuses A and B have the same configuration. A description will be provided of the configuration of the information processing apparatus A.

In FIG. 1, a CPU (central processing unit) 1 controls the entire apparatus according to programs (to be described later). A ROM (read-only memory) 2a stores programs for loading main programs (an OS (operating system) and the like). A RAM (random access memory) 3a includes areas for executing programs, areas for storing data, and the like. An input device 4a comprises a keyboard, a mouse and the like for manually inputting programs and data. A display device 5a displays programs, data and the like. An external storage device 6a comprises hard disks and the like, and stores the main programs, application software, various kinds of data, and the like. A network transmission/reception unit 7a controls data transmission/reception with a network. Reference numeral 10 represents a network, such as the Ethernet, FDDI or the like, and connects the information apparatuses A and B to each other.

Figure 2:
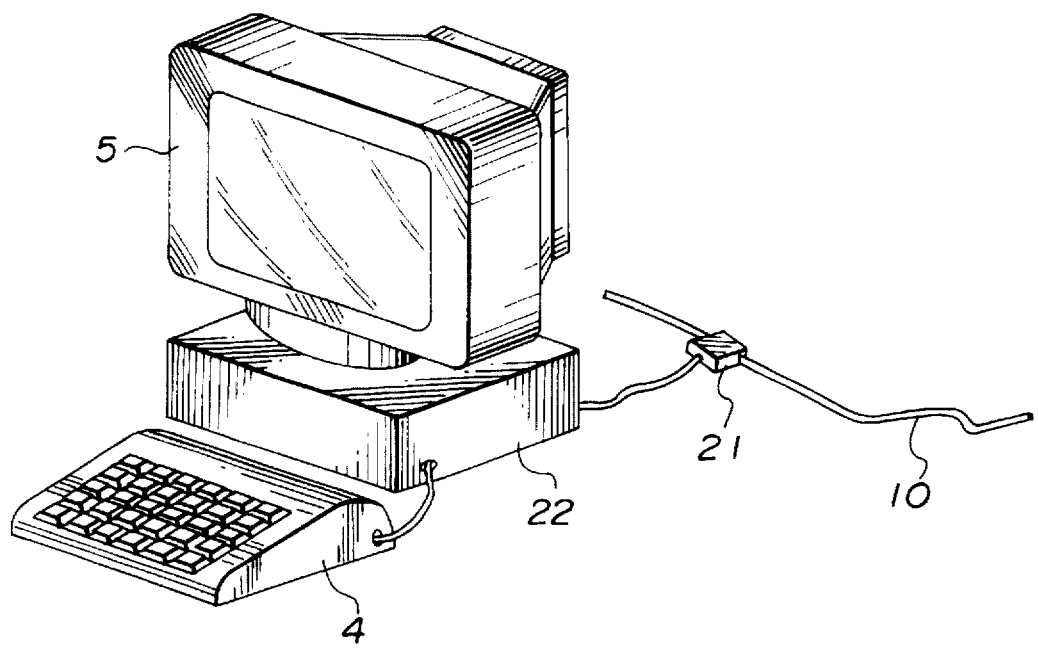
FIG. 2 is a perspective view illustrating an external appearance of the information processing apparatus connected to the network.

FIG. 2 is a perspective view illustrating an external appearance of the information processing apparatus A. In FIG. 2, a connector 21 connects the information processing apparatus A to the network 10. A main body 22 incorporates the CPU 1a, the ROM 2a, the RAM 3a, the external storage device 6a and the like.

Figure 3:
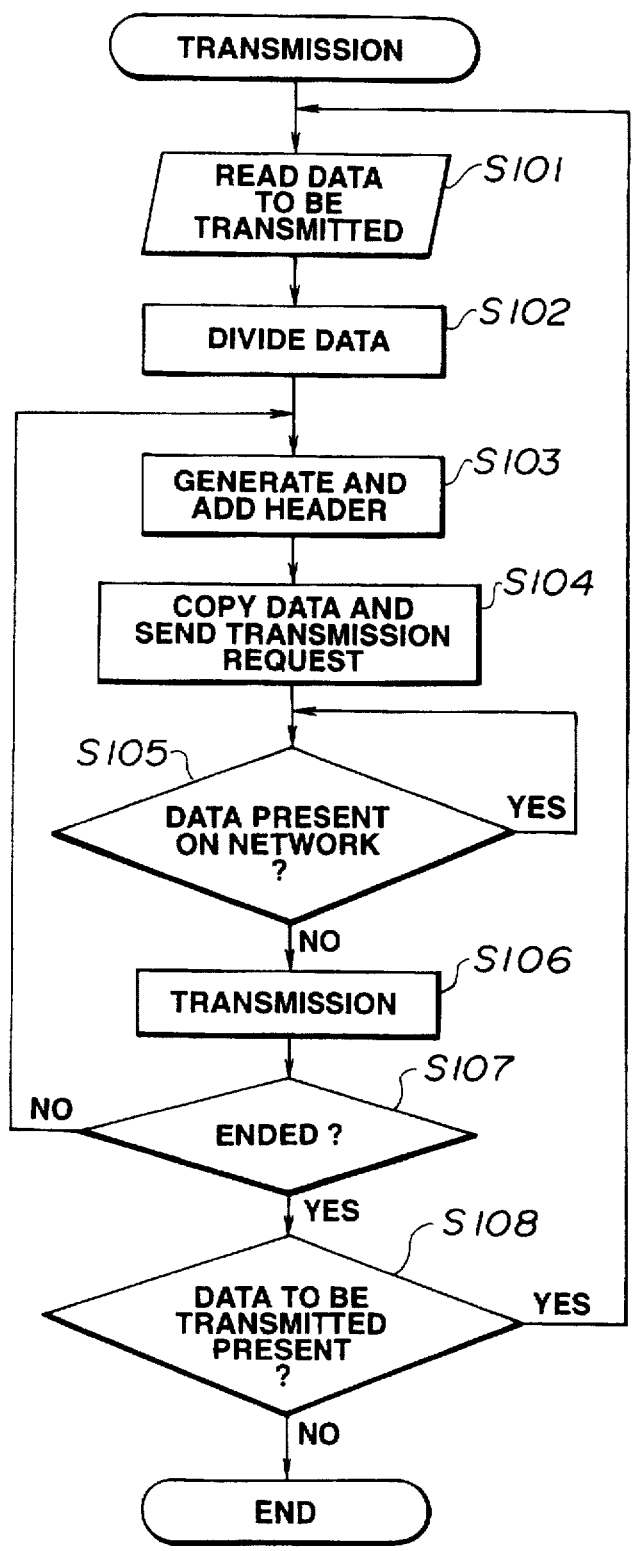
FIG. 3 is a flowchart illustrating the transmission processing of the information processing apparatus shown in FIG. 1.
Figure 4:
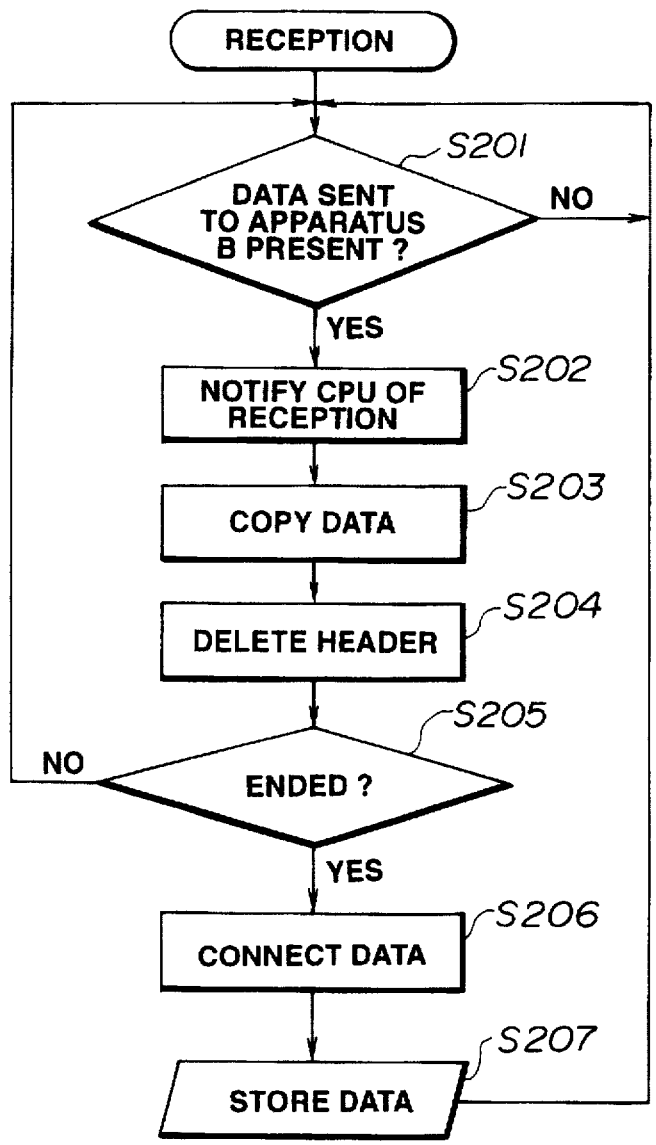
FIG. 4 is a flowchart illustrating the reception processing of the information processing apparatus shown in FIG. 1.

Next, a description will be provided of processing procedures when transmitting calculated data and moving-picture data stored in the external storage device 6a of the information processing apparatus A to the information processing apparatus B using the network 10, with reference to flowcharts shown in FIGS. 3 and 4.

FIG. 3 is a flowchart illustrating transmission processing in the information processing apparatus A, and FIG. 4 is a flowchart illustrating reception processing in the information processing apparatus B.

First, in step S101 shown in FIG. 3, the CPU 1a of the information processing apparatus A reads a constant amount of data (for example, data for one picture frame in the case of moving-picture data) to be transmitted from the external storage device 6a, and develops the read data in the RAM 3a. In step S102, the data is divided into portions having a size allowed for the network 10. In step S103, headers necessary for transmission to the network 10, such as the communication partner's address, the user's own address, the kind of protocol and the like, are generated and added to the data to provide a packet. In step S104, the packet is copied to a RAM within the network transmission/reception unit 7a, and a transmission request is sent to the network transmission/reception unit 7a.

Next, in step S105, the network transmission/reception unit 7a checks if a packet is already present on the network 10. If the result of the check is affirmative, it is awaited until the packet disappears. When the packet has disappeared, the process proceeds to step S106, where transmission is performed. In step S107, it is determined if all divided data have been transmitted. If data remains, the process returns to step S103, and the above-described processing is repeated. When all the data have been transmitted, the process proceeds to step S108. If any other data to be transmitted is present, the above-described processing after step S101 is repeated. If no data is present, the transmission processing is terminated.

On the other hand, in the information processing apparatus B, in step S201 shown in FIG. 4, a network transmission/reception unit 7b monitors headers in packets flowing on the network 10. When a packet sent to the information processing apparatus B has flowed, the flowed packet is copied to a RAM within the network transmission/reception unit 7b. In step S202, a CPU 1b is notified that the packet has been received. In step S203, the CPU 1b copies the packet from the RAM within the network transmission/reception unit 7b to a RAM 3b. In step S204, a header for the network is deleted. Next, in step S205, it is determined if a constant amount of data (for example, data for one picture frame in the case of moving-picture data) has been received. If the result of the determination is negative, the process returns to step S201, and the above-described processing is repeated. When all data have been received, the process proceeds to step S206, where the divided data are connected. In step S207, the received data is stored in an external storage device 6b.

If the received data comprises moving-picture data, moving-picture data for one picture frame is displayed on a display device 5b. In this case, by performing the above-described processing, for example, for every 1/30 second, moving-picture images represented by data stored in the external storage device 6a of the information processing apparatus A can be displayed on the display device 5b of the information processing apparatus B.

Next, a description will be provided of the configuration and the operation of the information processing apparatuses in the first embodiment.

Figure 5:
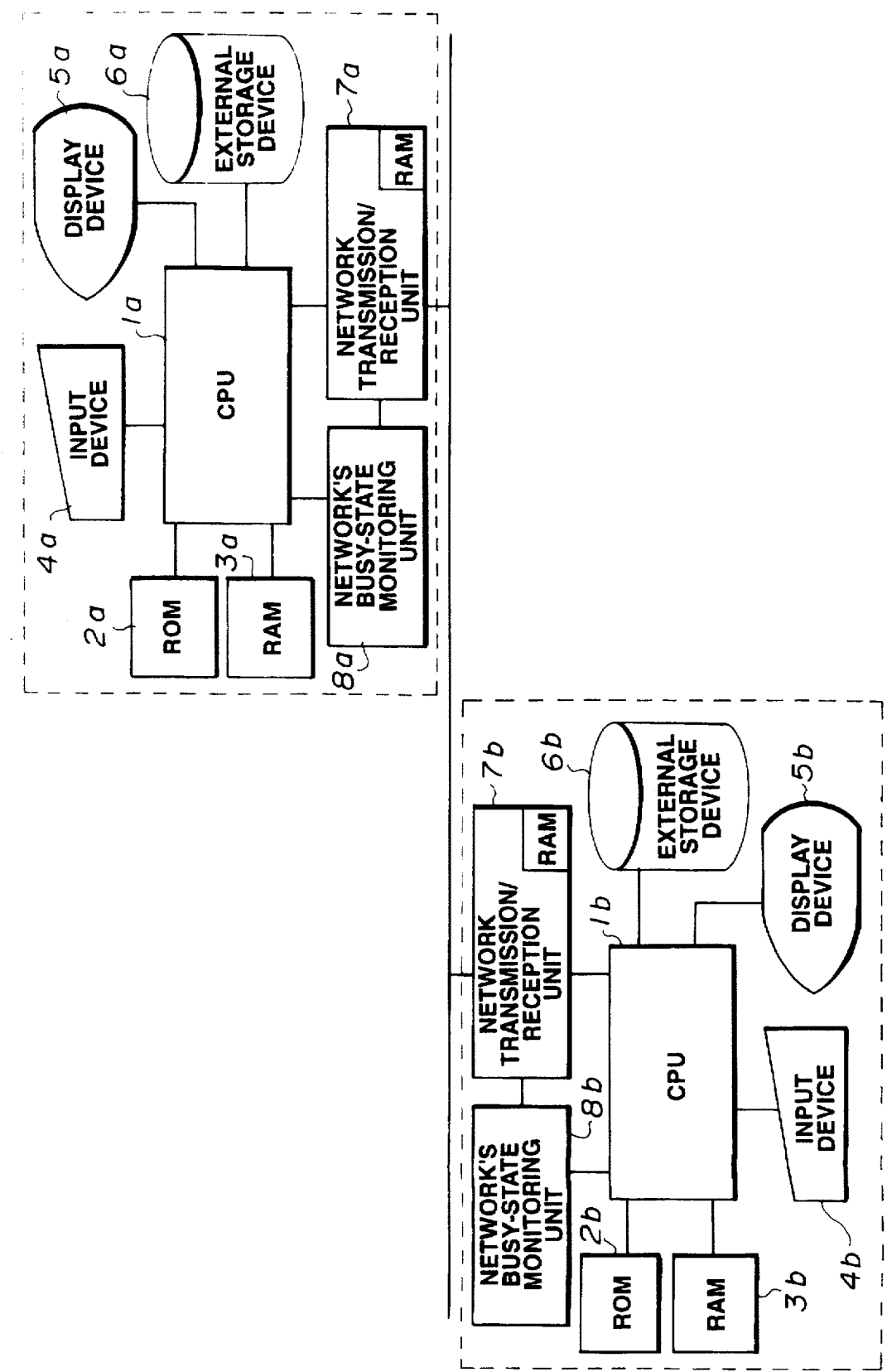
FIG. 5 is a schematic block diagram illustrating the configuration of an information processing apparatus according to a first embodiment of the present invention.

FIG. 5 is a schematic block diagram illustrating the configuration of information processing apparatuses of the present embodiment. As in the case of FIG. 1, the apparatuses are connected to the network 10. In FIG. 5, the same components as those shown in FIG. 1 are indicated by the same reference numerals, and a description thereof will be omitted.

As shown in FIG. 5, in the present embodiment, network's busy-state monitoring units 8a and 8b for checking a busy state of the network 10 are added to the configuration of FIG. 1. When transmitting data, by determining if data must be compressed or changing the compression method in accordance with the busy state of the network 10, the amount of data to be transmitted is reduced.

Figure 6:
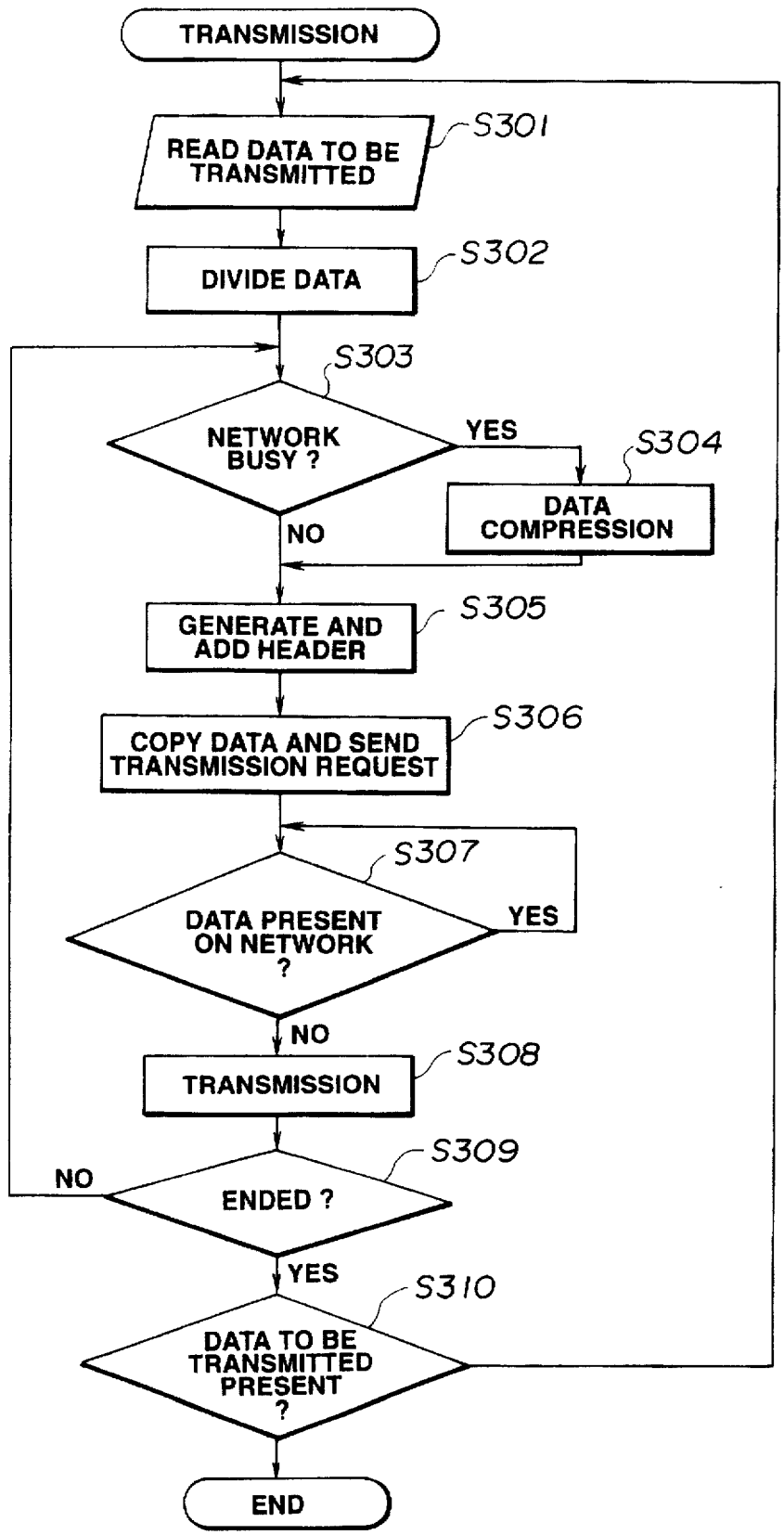
FIG. 6 is a flowchart illustrating the transmission processing of the information processing apparatus shown in FIG. 5.
Figure 7:
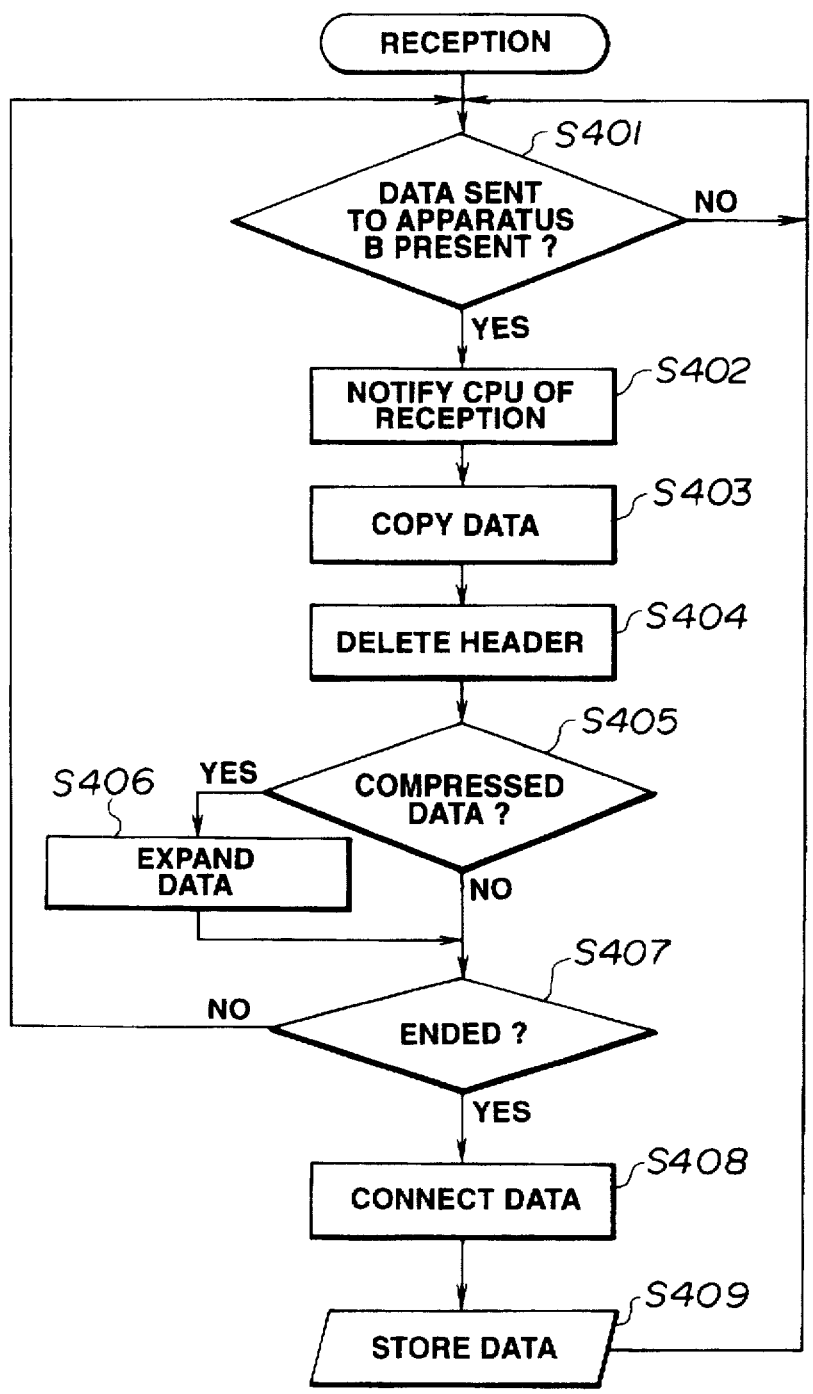
FIG. 7 is a flowchart illustrating the reception processing of the information processing apparatus shown in FIG. 5.

In the configuration shown in FIG. 5, first, a description will be provided of processing of transmitting calculated data stored in the external storage device 6a of the information processing apparatus A to the information processing apparatus B using the network 10, and storing the transmitted data in the external storage device 6b of the information processing apparatus B, with reference to the flowcharts shown in FIGS. 6 and 7.

FIG. 6 is a flowchart illustrating transmission processing in the information processing apparatus A, and FIG. 7 is a flowchart illustrating reception processing in the information processing apparatus B.

First, in step S301 shown in FIG. 6, the CPU 1a of the information processing apparatus A reads a constant amount of data to be transmitted from the external storage device 6a, and develops the read data in the RAM 3a. In step S302, the data is divided into portions having a size allowed for the network 10. In step S303, the busy state of the network 10 monitored by the network's busy-state monitoring unit 8a is checked. If the network 10 is busy, the process proceeds to step S304, where the divided data are compressed by a predetermined compression method. In step S305, headers necessary for transmission to the network 10, such as the communication partner's address, the user's own address, the kind of protocol and the like, are generated and added to the data to provide a packet. In step S306, the packet is copied to the RAM within the network transmission/reception unit 7a, and a transmission request is sent to the network transmission/reception unit 7a.

Next, in step S307, the network transmission/reception unit 7a checks if a packet is already present on the network 10. If the result of the check is affirmative, it is awaited until the packet disappears. When the packet has disappeared, the process proceeds to step S308, where transmission is performed. In step S309, it is determined if all divided data have been transmitted. If data remains, the process returns to step S303, and the above-described processing is repeated. When all the data have been transmitted, the process proceeds to step S310. If any other data to be transmitted is present, the above-described processing after step S301 is repeated. If no data is present, the transmission processing is terminated.

On the other hand, in the information processing apparatus B, in step S401 shown in FIG. 7, the network transmission/reception unit 7b monitors headers in packets flowing on the network 10. When a packet sent to the information processing apparatus B has flowed, the flowed packet is copied to the RAM within the network transmission/reception unit 7b. In step S402, the CPU 1b is notified that the packet has been received. In step S403, the CPU 1b copies the packet from the RAM within the network transmission/reception unit 7b to the RAM 3b. In step S404, a header for the network is deleted.

Next, in step S405, it is checked if data obtained by deleting the header comprises compressed data. If the result of the check is affirmative, the process proceeds to step S406, where the data is expanded to return to the original data. In step S407, it is determined if a constant amount of data has been received. If the result of the determination is negative, the process returns to step S401, and the above-described processing is repeated. When all data have been received, the process proceeds to step S408, where the divided data are connected. In step S409, the received data is stored in the external storage device 6b.

Various approaches can be considered for the determination of the busy state in step S303 shown in FIG. 6. In one approach, the amount of circulation of data is calculated by dividing the amount of data flowed on the network 10 per unit time by the maximum amount of data which can be flowed on the network 10 per unit time. If the value exceeds 0.5, it is determined that the network 10 is busy, and data is flowed by being compressed.

Next, a description will be provided of a data compression method when the network 10 is determined to be busy, for example, in the above-described manner.

In the present embodiment, so-called ADCP (adaptive discrete cosine transform) adopted by the JPEG (Joint Photographic Experts Group) is used.

Figure 18:
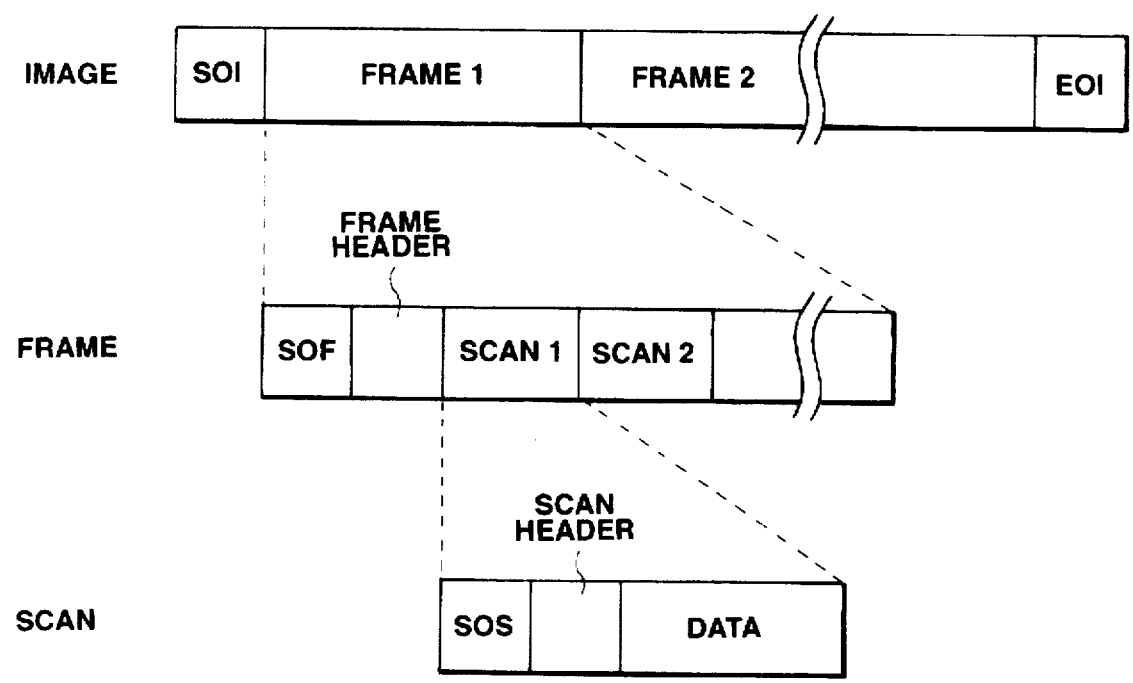
FIG. 18 is a diagram illustrating the data structure in a JPEG method.

JPEG compressed image data comprises data encoded based on the JPEG method of the CCITT/ISO (Comité Consulatif International Télégraphique et Téléphonique/International Organization for Standardization), which is an international standardized method for compressing a color still-picture image utilizing frequency characteristics of data and visual characteristics of a person. The data comprises encoded data and various kinds of marker codes which constitute an image/frame-scan hierarchical structure as shown in FIG. 18.

That is, the JPEG data comprises an SOI (start of image) code, at least one frame, and an EOI (end of image) code. In the case of data subjected to hierarchical encoding, a plurality of frames are present in each hierarchy. In the case of data not subjected to hierarchical encoding, the data includes a single frame.

Each frame comprises an SOF (start of frame) code, a frame header and scans. Each scan comprises an SOS (start of scan) code, a scan header and encoded data.

When luminance data (Y) and two color difference data (Cr and Cb) are dealt with independently (when interleaving processing is performed), a plurality of scans are present in each frame. When the above-described data are dealt with at a time (when non-interleaving processing is performed), the frame includes a single scan.

Figure 19:
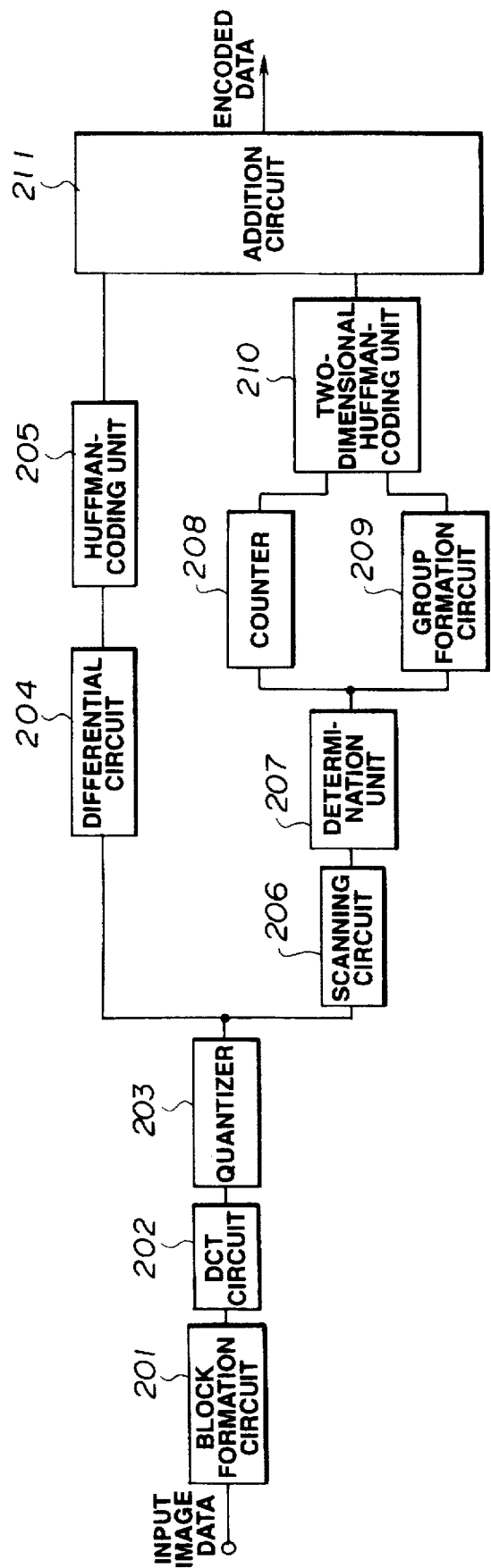
FIG. 19 is a diagram illustrating the configuration of an encoding in the JPEG method.
Figure 20:
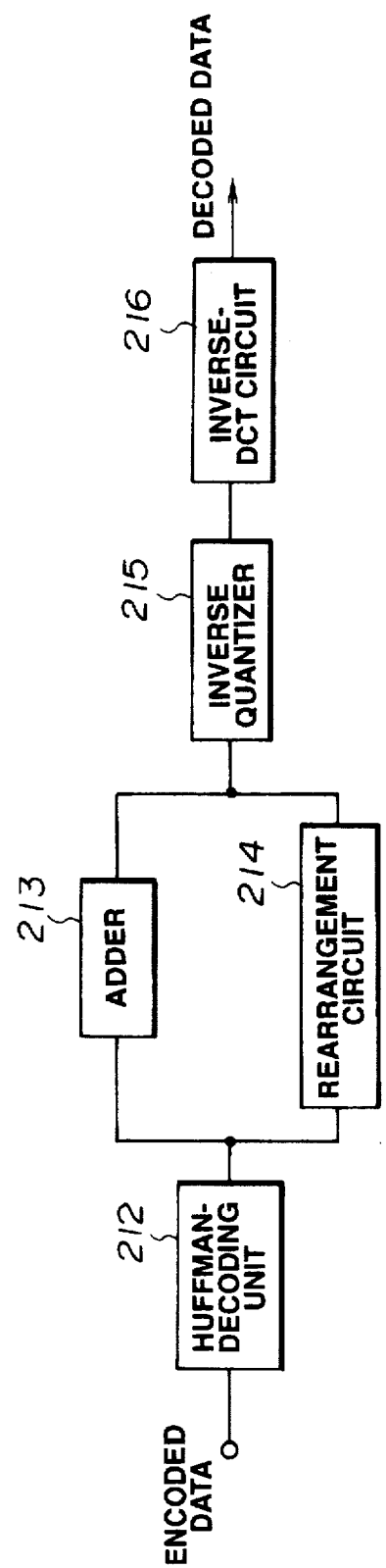
FIG. 20 is a diagram illustrating the configuration of a decoding in the JPEG method.

Next, a description will be provided of algorithms in encoding and decoding operations in a basic baseline system in the above-described JPEG method, with reference to FIGS. 19 and 20.

First, input image data is divided into data in units of a block, comprising 8 pixels×8 pixels, by a block formation circuit 201. The divided data are subjected to two-dimensional DCT (discrete cosine transform) by a DCT circuit 202, to be converted into horizontal/vertical space-frequency components (DCT coefficients), comprising one kind of DC component (DC) and 63 kinds of AC components (AC's).

Each frequency component obtained thereby is quantized by being divided by a corresponding predetermined coefficient (quantization coefficient) by a quantizer 203, and is then encoded by an algorithm which differs for DC components and AC components.

The quantization coefficient differs, in general, for each frequency coefficient. Quantization coefficients for low-frequency components, which are important for the visual sense, are set to be smaller than quantization coefficients for high-frequency components.

Thus, high-frequency components, which are less important, are cut, so that the total amount of data can be reduced.

Utilizing the fact that correlation between adjacent blocks is high in DC components, the difference between the target DC component and the DC component in the immediately preceding block is obtained by a differential circuit 204, and the obtained difference value is subjected to onedimensional Huffman coding by a Huffman-coding circuit 205, to provide encoded data of the DC component.

The above-described 63 kinds of AC components are sequentially subjected to zigzag scanning starting from low-frequency components, which are important for the visual sense, by a scanning circuit 206, to be converted into onedimensionally arranged data. A determination unit 207 determines whether the value of each component comprises a "0 value" or a value other than a 0 value (an effective coefficient).

A counter 208 counts the run length of 0 values, and a group formation circuit 209 forms groups according to the values of effective coefficients. A two-dimensional Huffman coding circuit 210 performs two-dimensional Huffman coding based on the combination of the run lengths and the values of the groups, which have been obtained, to provide encoded data of AC components.

In the above-described Huffman coding, the entire amount of data is reduced by allocating shorter code lengths for components having high occurrence probability (the above-described difference value for DC components, and the combination of the run lengths and the effective coefficients for AC components).

For components having low occurrence probability, all patterns can be represented by a finite number of codes by being combined with a predetermined code (ZRL code).

By performing the above-described processing in units of a block, encoding of one color still-picture image is completed. Thereafter, an addition circuit 211 adds the above-described marker codes and the like to the above-described encoded data, to provide JPEG-compressed image data shown in FIG. 18.

Since the above-described quantization coefficients and Huffman codes can be arbitrarily set, data indicating the quantization coefficients and the Huffman codes used in encoding are added after the above-described SOI code.

Next, a description will be provided of an algorithm for decoding.

Basically, the algorithm for decoding is inverse to the algorithm for encoding. Input encoded data is decoded by a Huffman-decoding unit 212 using a Huffman table transmitted together with the data. As for DC components, an adder 213 adds the target DC component to the DC compoment of the immediately preceding block, to provide the original DC component. As for AC compoments, a rearrangement circuit 214 converts respective decoded frequency components into the original two-dimensional arrangement.

After performing inverse quantization of the frequency components by an inverse quantizer 215, an inverse-DCT circuit 216 performs inverse DCT, whereby the components are converted into the original image data (decoded data).

By performing the above-described processing in units of a block, decoding of one color still-picture image is completed.

It is determined whether or not the above-described JPEG compression must be performed for each block, obtained by dividing one picture frame into a predetermined number of blocks, in accordance with the busy state of the network 10.

Although in the present embodiment the execution of compression is determined for each block obtained by dividing one picture frame, the determination may be performed for each picture frame without dividing it into blocks.

Although in the present embodiment the above-described algorithms for encoding and decoding are realized by software stored in the CPU 1, the algorithms may be realized using hardware comprising independent encoding unit and decoding unit.

As described above, according to the present embodiment, by compressing data to be transmitted when the amount of circulation on the network 10 is large, a large amount of data can be transmitted without hindering the transfer of other data.

In the present embodiment, after dividing data into data having a size which can be transmitted on the network 10, it is checked if the network 10 is busy, and the divided data are compressed. This approach permits finer control compared with a case in which after checking if the network 10 is busy and compressing data, the data is divided.

Second Embodiment

Figure 8:
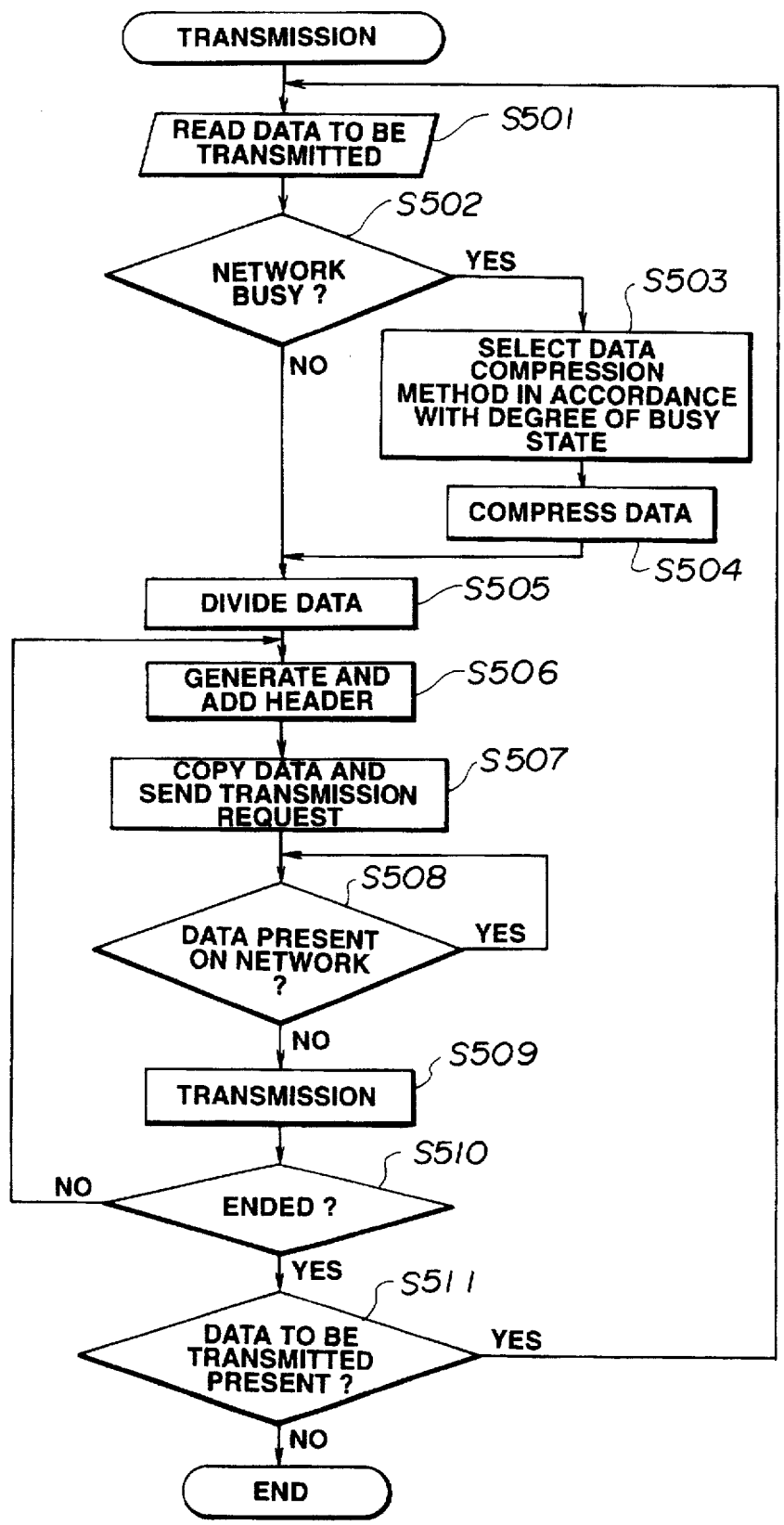
FIG. 8 is a flowchart illustrating transmission processing in a second embodiment of the present invention.
Figure 9:
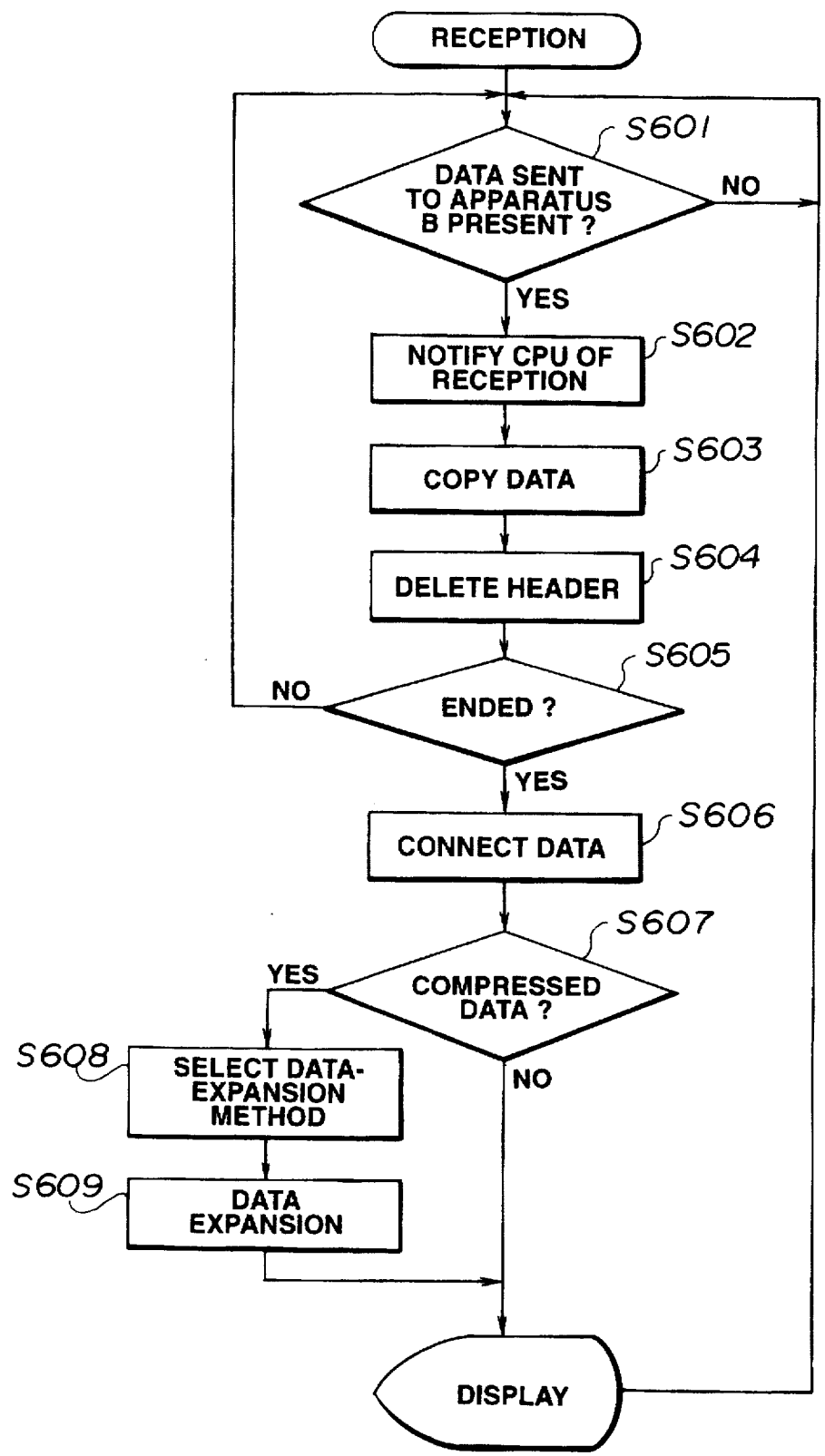
FIG. 9 is a flowchart illustrating reception processing in the second embodiment.

In the configuration shown in FIG. 5, a description will be provided of processing of transmitting movingpicture data stored in the external storage device 6a of the information processing apparatus A to the information processing apparatus B using the network 10, and displaying the transmitted data on the display device 5b of the information processing apparatus B as moving images, with reference to the flowcharts shown in FIGS. 8 and 9.

First, in step S501 shown in FIG. 8, the CPU 1a of the information processing apparatus A reads moving-picture data for one frame to be transmitted from the external storage device 6a and develops the read data in the RAM 3a. In step S502, a busy state of the network 10 monitored by the network's busy-state monitoring unit 8a is checked. If the network 10 is busy, the process proceeds to step S503, where a compression method is selected in accordance with the detected busy state (the rate of the busy state) of the network 10. In the subsequent step S504, the moving-picture data for one picture frame is compressed based on the selected compression method. When the network 10 is not busy, data compression is not performed. In the next step S505, data is divided into data having a size allowed for the network 10. In step S506, headers necessary for transmission to the network 10, such as the communication partner's address, the user's own address, the kind of protocol and the like, are generated and added to the data to provide a packet. In step S507, the packet is copied to the RAM within the network transmission/reception unit 7a, and a transmission request is sent to the network transmission/reception unit 7a.

Next, in step S508, the network transmission/reception unit 7a checks if a packet is already present on the network 10. If the result of the check is affirmative, it is awaited until the packet disappears. When the packet has disappeared, the process proceeds to step S509, where transmission is performed. In step S510, it is determined if all divided data have been transmitted. If data remains, the process returns to step S506, and the above-described processing is repeated. When all the data have been transmitted, the process proceeds to step S511. If any other data to be transmitted is present, the above-described processing after step S501 is repeated. If no data is present, the transmission processing is terminated.

On the other hand, in the information processing apparatus B, in step S601 shown in FIG. 9, the network transmission/reception unit 7b monitors headers in packets flowing on the network 10. When a packet sent to the information processing apparatus B has flowed, the flowed packet is copied to the RAM within the network transmission/reception unit 7b. In step S602, the CPU 1b is notified that the packet has been received. In step S603, he CPU 1b copies the packet from the RAM within the network transmission/reception unit 7b to the RAM 3b. In step S604, a header for the network is deleted.

Next, in step S605, it is determined if moving-picture data for one picture frame has been received. If the result of the determination is negative, the process returns to step S601, and the above-described processing is repeated. If the result of the determination is affirmative, the process proceeds to step S606, where divided data are connected. In step S607, it is checked if the connected data comprise compressed data. If the result of the determination is affirmative, the process proceeds to step S608, where the compression method is checked, and a data expansion method corresponding to the compression method is selected. In step S609, data expansion is performed. Then, in step S610, moving-picture data for one picture frame is displayed on the display device 5b.

By performing the above-described processing, for example, for every 1/30 second, moving images stored in the external storage device 6a of the information processing apparatus A can be displayed on the display device 5b of the information processing apparatus B.

In contrast to program data of a computer, data in numerical calculation, and the like, a certain amount of missing information in image data and voice data will not cause a great obstacle for a person who actually sees the images or hears the voice. Utilizing this fact, many techniques have been developed in which image data and voice data are compressed by skipping a part of image and voice information with a certain rule, and interpolating the skipped portion at the side reproducing the image and voice information. In contrast to a case in which data compression is reversible, in the above-described techniques, data can be greatly compressed.

However, when data is greatly compressed, high-quality images and voice cannot be obtained even after interpolation.

In the above-described embodiment, since the compression method is changed in accordance with the degree of the busy state of the network 10, image data and voice data can be received without providing the network 10 with a load which is more than necessary, and without degrading the quality of obtained images and voice more than necessary at the reception side.

Figure 11:
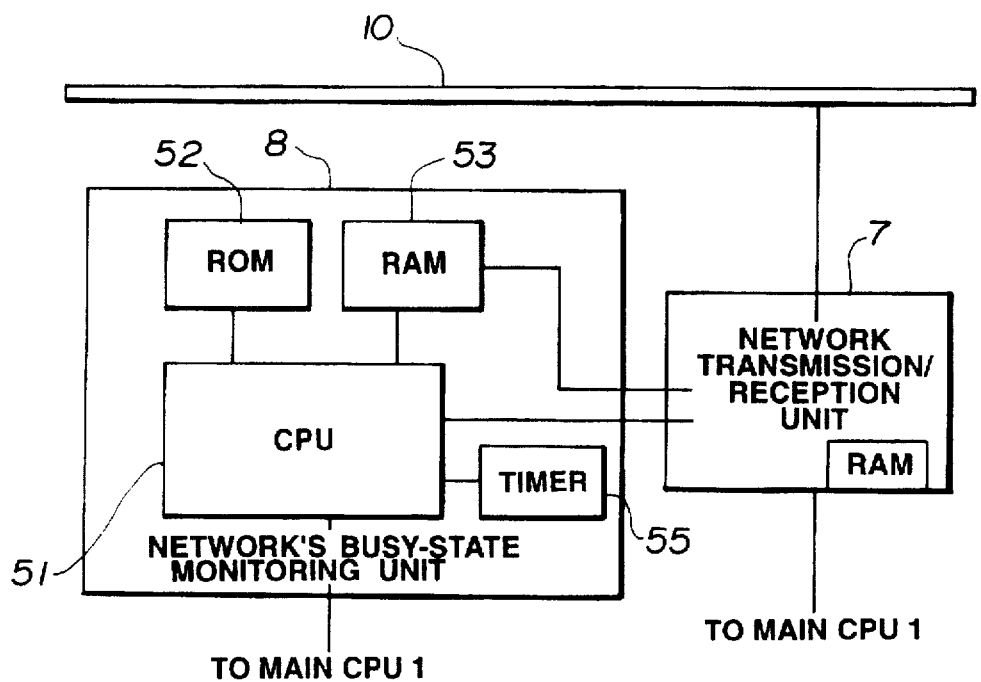
FIG. 11 is a diagram illustrating the configuration of a network's busy-state monitoring unit.
Figure 12:
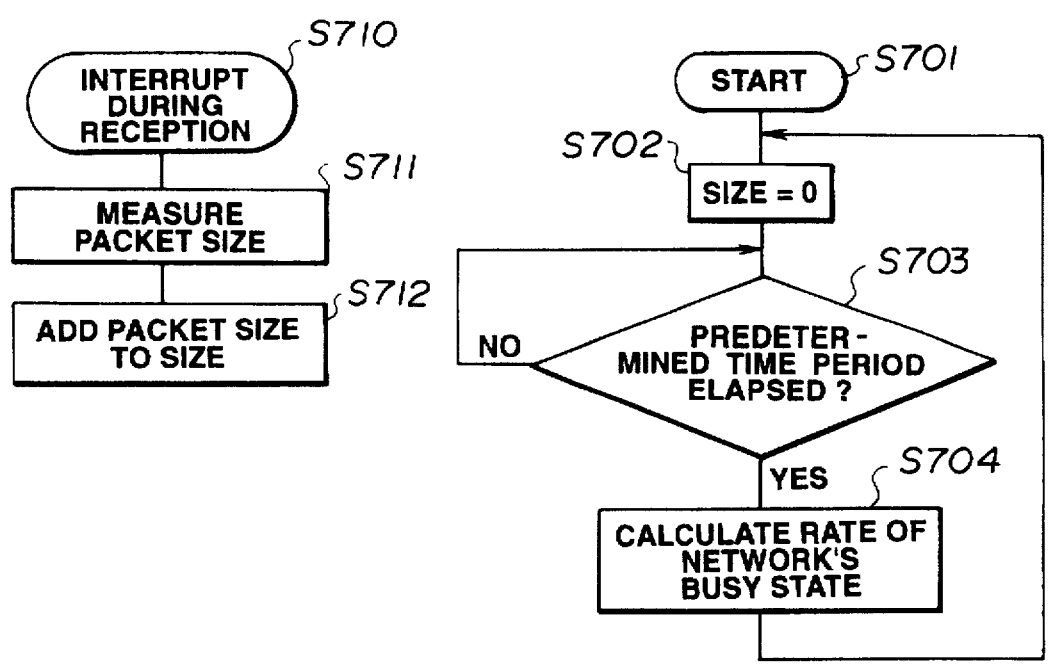
FIG. 12 is a flowchart for calculating a rate of a busy state.

Next, the operation of the network's busy-state monitoring unit of the present embodiment will be described in detail. FIG. 11 is a block diagram of the network's busy-state monitoring unit, and FIG. 12 is a flowchart illustrating the operation of the network's busy-state monitoring unit. In FIG. 11, there are shown a CPU 51 for executing programs stored in a ROM 52. The ROM 52 stores programs for monitoring the network 10, and the like. A RAM 53 stores data from the CPU 51 executing programs, and develops packets on the network 10. The network's busy-state monitoring unit also incorporates the CPU, ROM and ROM separate from those in the main body of the apparatus, so that the CPU 51 can access the RAM within the network transmission/reception unit. In the present embodiment, the network 10 comprises a bus-type network, such as Ethernet or the like. Reference numeral 55 represents a timer for measuring time.

Upon reception of a packet having a unit's own address or a broadcast address, the network transmission/reception unit 7 develops the received data in the RAM within the network transmission/reception unit 7, and interrupts the CPU 51 when the reception of the packet has been completed, to notify the CPU 1 of the reception of the packet. The network transmission/reception unit 7 simultaneously performs operations of developing all data present on the network 10 in the RAM 53 of the network's busy-state monitoring unit, and interrupting the CPU 51 of the network's busy-state monitoring unit when the reception of one packet has been completed, to notify the CPU 1 of the reception of the packet.

Also in a transmission operation, the network transmission/reception unit 7 transmits a packet to the network 10, develops the packet in the RAM 53 of the network's busy-state monitoring unit, and interrupts the CPU 51 of the network's busy-state monitoring unit.

Next, a description will be provided of the calculation of the rate of the busy state. First, the CPU 51 of the network's busy-state monitoring unit sets the size of the variable to 0 (step S702), and waits for the lapse of a predetermined time period (step S703). Upon reception of interrupt during reception from the network transmission/reception unit 7 (step S710), the process proceeds to step S711, where the packet size is measured, and the measured packet size is added to the size of the variable (step S712). After the lapse of the predetermined time period, the rate of the network's busy state is calculated (step S704). If the maximum amount of transfer of the network is represented by m bits/sec, the predetermined time period is represented by t seconds, and the size of the packet received during the predetermined time period is represented by s octets, the rate of the network's busy state is obtained by 800s/tm%.

Based on this rate of the network's busy state 800s/tm, it is determined if MPEG compression is to be performed, or the compression ratio is controlled when performing compression.

Next, a description will be provided of a MPEG method which is the compression method used in the present embodiment.

The MPEG method is an international standard for high-efficiency encoding of a moving image. This method basically utilizes frequency characteristics of data and visual characteristics of a person, but performs higher-efficiency encoding utilizing redundancy in the direction of the time base which is peculiar to a moving image.

The MPEG method comprises MPEG1, having a maximum transfer rate of 1.5 Mbps, for digital storage media, and MPEG2, which is intended to be used in all kinds of transmission systems, such as bidirectional digital multimedia apparatuses, digital VCR's (video cassette recorders), ATV's (amateur televisions), optical fiber networks, and the like, and in which the transfer rate has no upper limit. Since the two methods use substantially the same basic algorithm, a description will be provided of the data structure and the algorithm for encoding/decoding of the MPEG1.

In the MPEG2, a usable encoding method is provided by a plurality of profiles (simple profile, main profile, scalable, spatially scalable, and high), but the typical main profile is basically the same as in the MPEG1.

First, a description will be provided of the principle of a high-efficiency encoding method according to the MPEG method.

In this high-efficiency encoding method, high-efficiency encoding is realized on the whole by reducing redundancy in the direction of the time base by obtaining the difference between frames, and performing DCT and variable-length encoding of the obtained difference data, to reduce redundancy in the spatial direction.

Paying attention to the fact that correlation between continuous frames is high in moving images, redundancy in the direction of the time base can be reduced by taking the difference between a frame to be encoded and a frame preceding or succeeding the frame in time.

Figure 13:
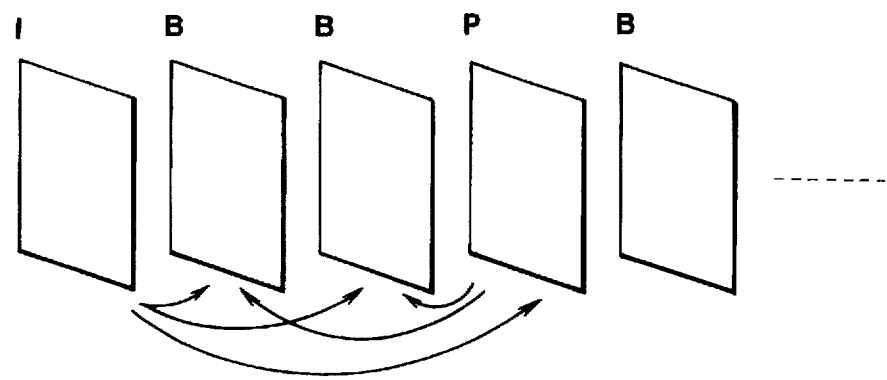
FIG. 13 is a diagram for explaining the principle of encoding in a MPEG method.

Accordingly, in the MPEG, as shown in FIG. 13, in addition to an intraframe-encoding image in which encoding is performed entirely within a frame, there are provided a forward predictive encoding image (P-picture) in which difference values between the target frame and a frame which precedes the frame in time are encoded, and bidirectional predictive encoding images (B-pictures) in which values, having the minimum amount of data from among difference values between the target frame and a frame which precedes or succeeds the frame in time, or difference values between the target frame and an interpolated frame obtained from frames which precede and succeed the frame, are encoded. Respective frames in these encoding modes are combined with a predetermined sequence.

When a new object has appeared within an image, the difference values are, in some cases, smaller when difference values between the current image and an image which succeeds the image in time are obtained than when difference values between the current image and an image which precedes the image in time are obtained.

Hence, in the MPEG, the above-described bidirectional predictive encoding is performed, whereby compression of higher efficiency is performed.

In the MPEG, motion compensation is performed in order to obtain each predictive image.

That is, by obtaining difference values between a block (a macroblock), comprising 2×2=4 of the above-described blocks, each comprising 8 pixels×8 pixels, for luminance data, and comprising two of the above-described blocks for color difference data of the target image, and a macroblock in the vicinity of the block, and detecting a macroblock having the minimum difference values, a motion vector is detected, and the detected motion vector is encoded as data.

In the above-described motion compensation and predictive encoding, an image which precedes the target image in time is first encoded, and is then decoded to provide a preceding image.

The above-described data subjected to predictive encoding and the motion vector are subjected to high-efficiency encoding using DCT and Huffman encoding.

Next, a description will be provided of the data structure of the MPEG method.

Figure 14:
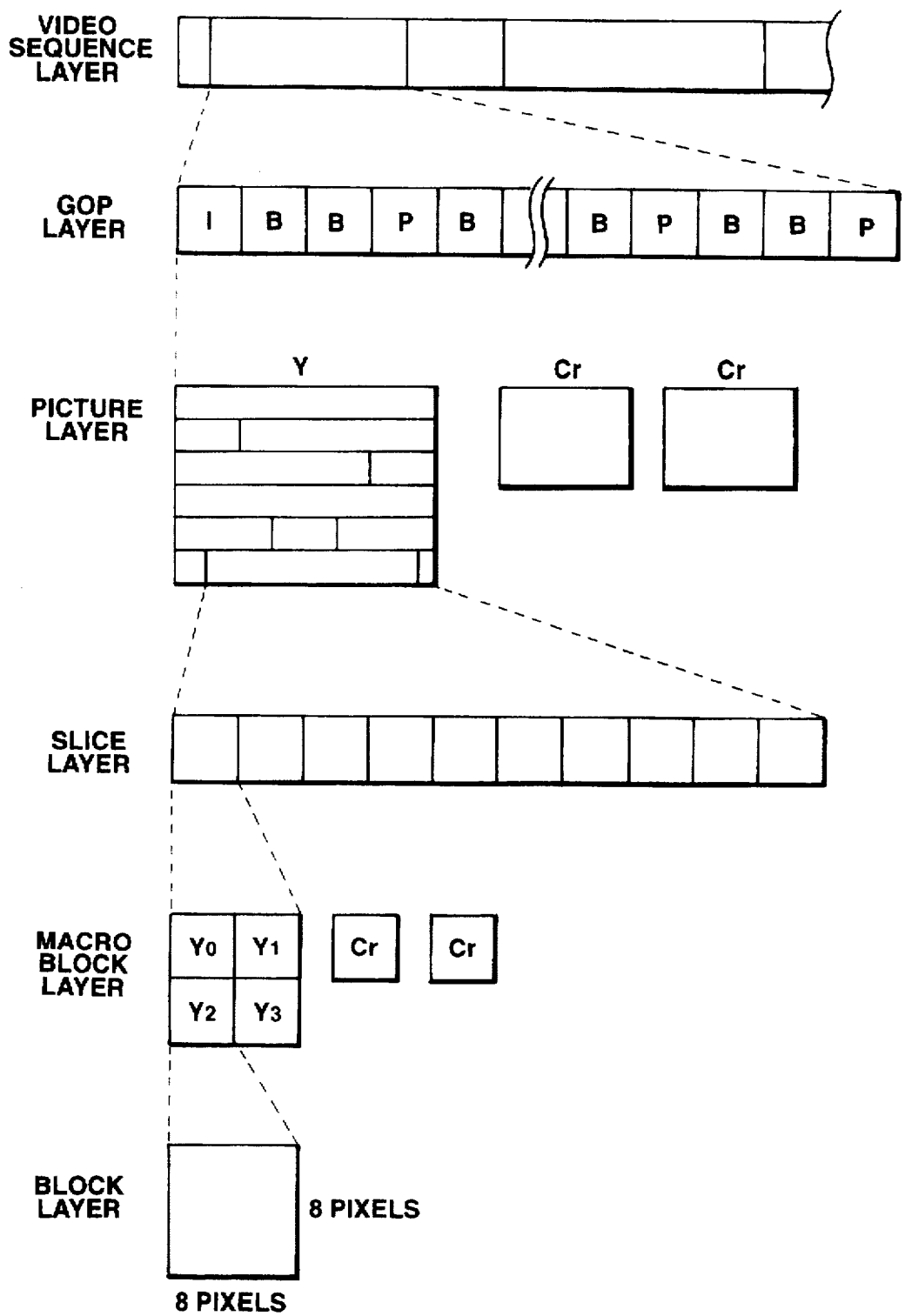
FIG. 14 is a diagram illustrating the data structure in the MPEG method.

As shown in FIG. 14, this data structure is configured by a hierarchical structure which comprises a video sequence layer, a GOP layer, a picture layer, a slice layer, a macroblock layer and a block layer.

The respective layers will now be described starting from the lowest layer shown in FIG. 14.

As in the above-described JPEG, the block layer comprises 8 pixels×8 pixels for each luminance data and color difference data, and DCT is performed in units of this block.

The macroblock layer includes macroblocks. As described above, the macroblock is configured by four blocks, each comprising 8 pixels×8 pixels, for luminance data, and by one such block for color difference data. In the MPEG method, the macroblock is made a unit for predictive encoding and the detection of the motion vector (to be described later).

A macroblock header includes respective data for motion compensation and the quantization step in units of a macroblock, and data indicating if six DCT blocks (Y0, Y1, Y2, Y3, Cr and Cb) within each macroblock include data.

The slice layer is configured by a single macroblock or a plurality of macroblocks connected in the order of image scanning, and a slice header. The quantization step in a series of macroblocks within the same slice layer is made constant. The slice header includes data relating to the position of the slice and the quantization step, so that even if an error is produced during encoding, the data can be restored in units of the slice.

The leading macroblock resets difference values of DC components.

The picture layer is configured by a plurality of the above-described slice layers in units of a frame, and includes a header, comprising a picture start code and the like, and a single slice mayer or a plurality of slice layers following the header.

The header includes a code indicating the encoding mode of the image and a code indicating accuracy in the motion detection (in units of a pixel or a semi-pixel).

The GOP layer is configured by a header, comprising a group start code, a time code indicating the time from the start of the sequence, and the like, and a plurality of I frames, B frames and P frames following the header.

The video sequence layer starts from a sequence-start code and ends at a sequence-end code. Control data, such as image-size data and the like, and a plurality of GOP's having, for example, the same image size are arranged between these codes.

In the MPEG method having such a data structure, a bit stream in each layer is provided.

Figure 15:
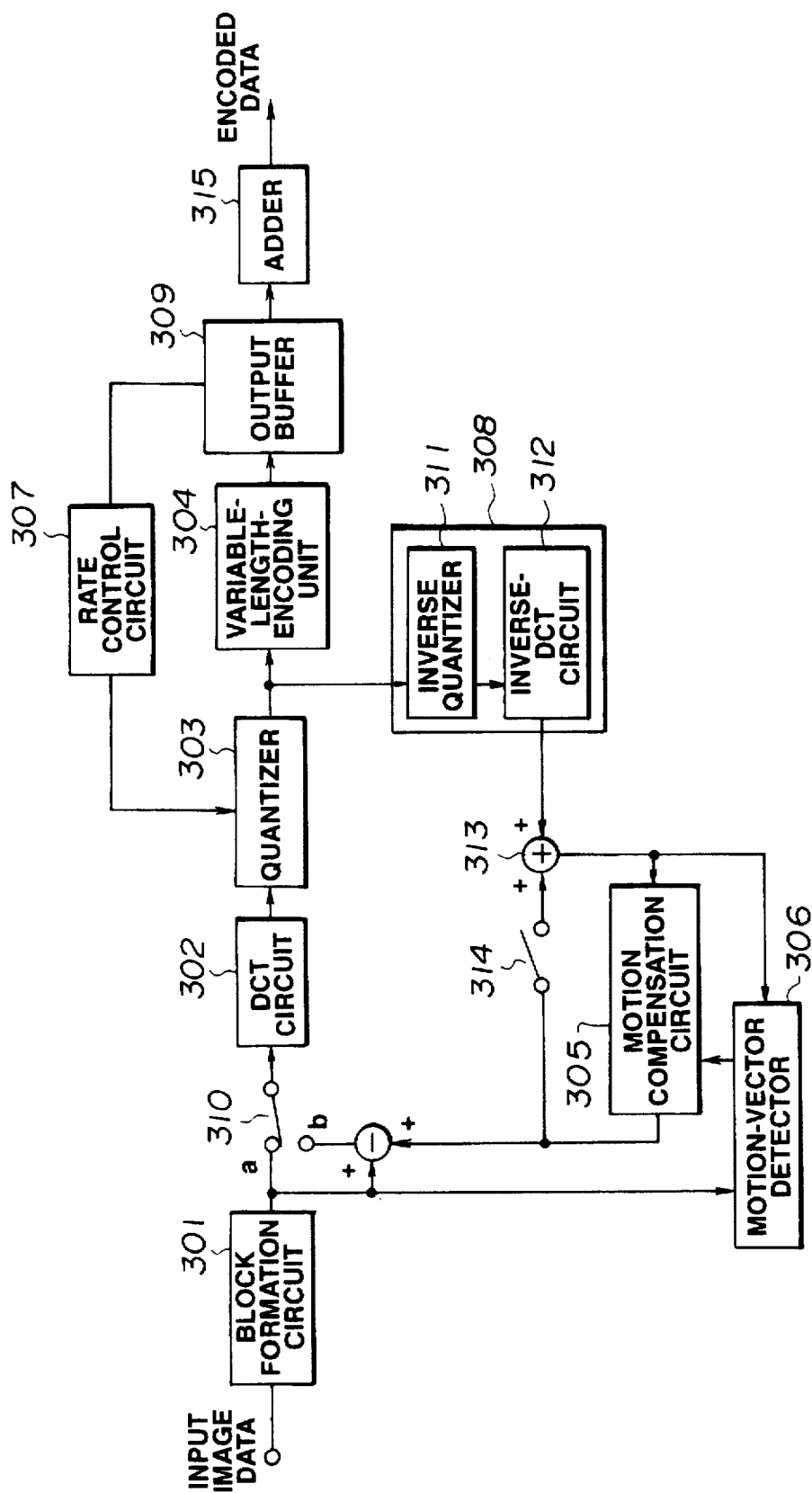
FIG. 15 is a diagram illustrating the configuration of an encoding unit in the MPEG method.
Figure 16:
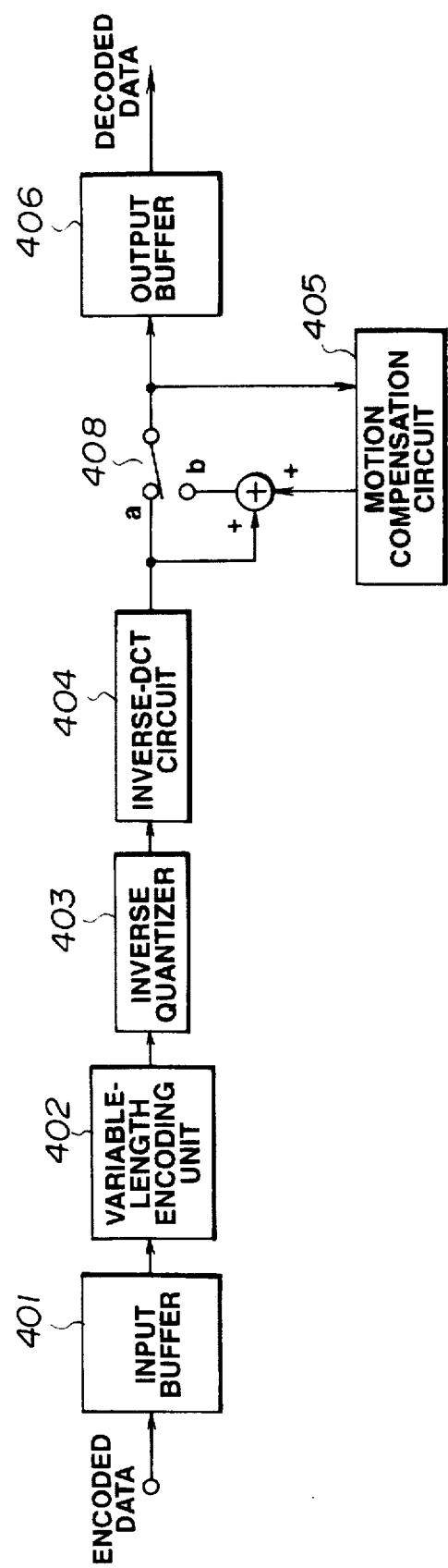
FIG. 16 is a diagram illustrating the configuration of a decoding unit in the MPEG method.

Next, a description will be provided of basic encoding unit and decoding unit which deal with the above-described MPEG data with reference to FIGS. 15 and 16.

As shown in FIG. 15, this encoding unit comprises a block formation circuit 301, a DCT circuit 302, a quantizer 303, a variable-length-encoding unit (VLC) 304, a motion compensation circuit 305, a motion-vector detector 306, a rate control circuit 307, a local decoder 308, an output buffer 309, and the like.

Figure 17:
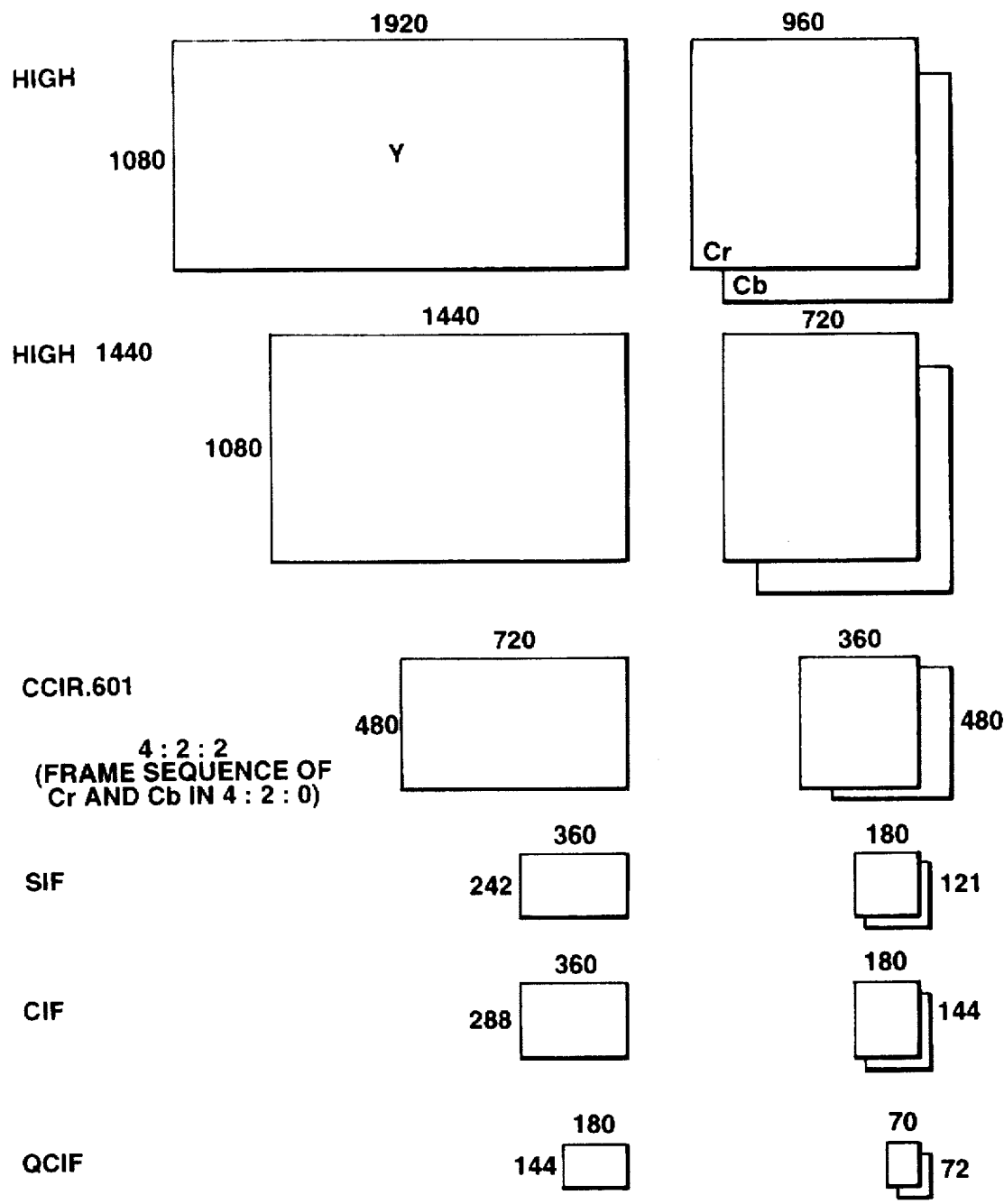
FIG. 17 is a diagram illustrating the sizes of images, whose data are to be encoded, in the MPEG method.

As shown in FIG. 17, the sizes of images to be encoded in this encoding unit correspond to 4:2:2, 4:2:0, SIF, CIF and QCIF formats. The MPEG1 deals with image size of the SIF format.

In this encoding unit, image data to be encoded is divided into the above-described blocks of 8 pixels×8 pixels by the block formation circuit 301, and is transmitted to the DCT circuit 302 via a switch 310.

The switch 310 is switched depending on whether the input image data comprises intraimage data or interimage data. The switch is connected to contact "a" in the case of intraimage data, and to contact "b" in the case of interimage data.

In the case of intraimage data, the data is subjected to DCT by the DCT circuit 302. DCT coefficients obtained by the DCT are quantized by the quantizer 303, are then encoded by the variable-length-encoding unit 304, and are temporarily stored in the buffer 309.

In the case of interimage data, the switch is connected to contact "b", and predictive encoding with the above-described motion compensation is performed.

The local decoder 308 comprises an inverse quantizer 311 and an inverse-DCT circuit 312. Data quantized by the quantizer 303 are returned to the original data by the local decoder 308.

There are also shown an adder 313, a switch 314 which is closed only in the case of interimage data, and a subtracter 316. A motion compensation circuit 305 outputs a corresponding macroblock of a predetermined image (a preceding image, a succeeding image or, an interpolated image of these two images) using the image data, which has been subjected to local decoding in the above-described manner, while referring to a motion vector detected by a motion-vector detector 306.

The output of the motion compensation circuit 305 is subtracted from the input image data by the subtracter 316, whereby a predictive value with motion compensation is obtained. The predictive value is encoded by the DCT circuit 302, the quantizer 303 and the variable-length-encoding unit 304, and is stored in the buffer 309.

The motion-vector detector 306 compares image data to be encoded with predetermined reference image data to obtain a motion vector. The output of the motion-vector detector 306 is supplied to the motion compensation circuit 305 to assign a macroblock to be output from the motion compensation circuit 305.

The rate control circuit 307 controls the amount of codes by switching the quantization step used in the quantizer 303 based on the occupied amount of encoded data in the buffer 309.

An adder 315 adds the above-described various kinds of header to the encoded data and transmits the resultant data as MPEG-compressed image data conforming to the MPEG method.

The decoding unit performs basically an operation inverse to the above-described encoding. As shown in FIG. 16, the decoding unit comprises an input buffer 401, a variable-length-decoding (VLD) unit 402, an inverse quantizer 403, an inverse-DCT circuit 404, a motion compensation circuit 405, an output buffer 406, and the like.

That is, encoded data sequentially read from the input buffer 401 are processed by the variable-length-decoding unit 402, the inverse quantizer 403 and the inverse-DCT circuit 404 to be converted into data in the space region.

An adder 407 adds a predictive value from the motion compensation circuit 405 to the output of the inverse-DCT circuit 404. A switch 408 selects one of the output of the inverse-DCT circuit 404 and the output of the adder 407.

The switch 408 is connected to contact "a" in the case of intraimage data based on an encoding identification code, and to contact "b" in the case of interimage data.

The above-described decoded data is temporarily stored in the output buffer 406, is then restored in the original spatial arrangement and output as image data for one frame.

In the present embodiment, the compression ratio is controlled by changing quantization parameters used in the quantizer 303 in accordance with the rate of the busy state 800s/tm.

As in the first embodiment, in the present embodiment, algorithms for encoding and decoding are realized by software stored in the CPU 1.

The kind of the network is not limited to a bus type, but any other type, such as a ring type or the like, may be adopted.

Figure 10A:
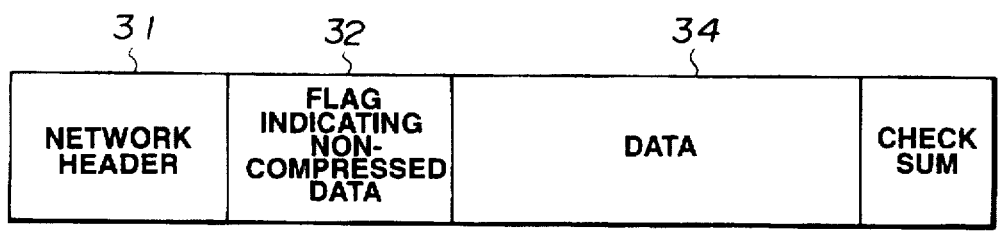
FIGS. 10(a) and 10(b) are diagrams illustrating the forms of packets.

In the above-described first and second embodiments, the execution of compression or the compression method is notified, for example, as shown in FIG. 10(a), by adding a flag 32, indicating whether or not compression is performed, or the compression method (for example, quantization parameters) between a header 31 and data 34 of the packet.

In this case, if the data is compressed, for example, a number corresponding to the compression method is set in the form of a character string, so that the reception side can determine whether or not the data is compressed, or the compression method when the data is compressed, and expand the data in accordance with the result of the determination.

Figure 10B:
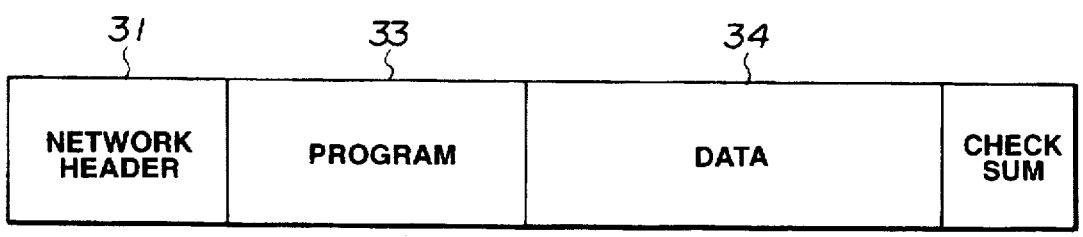

In the above-described second embodiment, the compression ratio is controlled by changing quantization parameters. However, when a plurality of compression algorithms (for example, a JBIG method, the JPEG method and the like) are used, as shown in FIG. 10(b), a program 33 for expanding compressed data may be added instead of the flag 32. In this case, the reception side determines that the received data is compressed if the program 33 is present, and executes the program 33. Thus, even if the reception side does not know the compression method or does not have an expansion program, the compressed data can be expanded.

If the program 33 is added to each packet, the added programs 33 become load of the network 10. Accordingly, a flag, indicating that the received data must be decoded in the same manner as in the preceding packet, may be provided.

In this case, when the transmission side has compressed data, a program describing the method of expanding the data is added to the compressed data, and a flag, indicating that data must be decoded in the same manner as in the preceding packet, is added to the head of each packet to be subsequentially transmitted, and the resultant data is transmitted. When another compression method has been thereafter selected in accordance with the busy state of the network, a program describing the method of expanding the transmitted data is added to the data, and the resultant data is transmitted.

When a program for expanding data is added to the received packet, the reception side expands the data according to the program. When a flag, indicating that subsequent packets must be decoded in the same method as in the preceding packet, is added, the reception side expands the received data according to the program for the preceding data. Thereafter, when a program for expanding data is added to the received packet, the program for expanding data which has previously been received is abandoned, and data is expanded according to the newly received program.

As described above, according to the above-described embodiments, when transferring data to an information processing apparatus via a network, by determining whether or not the data must be compressed or changing the compression method in accordance with the busy state of the network, the network is not greatly burdened. Thus, when transferring a large amount of data having low reliability, such as image data, voice data and the like, the compression ratio of data is increased when the network is busy, so that the network is not greatly burdened. When the network is not busy, the data is transferred while reducing the compression ratio or without performing data compression. As a result, the receiver can have high-quality data.

Furthermore, by transferring compressed data while adding a program describing the data expansion method to the data, the reception side can expand the received compressed data even if he does not know the data expansion method.

The present invention may be applied to a system comprising a plurality of apparatuses, or to an apparatus comprising only a single unit.

The present invention may, of course, be applied to a case in which the object of the invention can be achieved by supplying a system or an apparatus with a program.

As described above, according to the present invention, it is possible to reduce the burden on a network by determining whether or not data must be compressed or changing the compression method in accordance with the busy state of the network.

The individual components shown in outline or designated by blocks in the drawings are all well known in the communication method and apparatus arts and their specific construction and operation are not critical to the operation or the best mode for carrying out the invention.

While the present invention has been described with respect to what is presently considered to be the preferred embodiments, it is to be understood that invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus, connected to a network, for communicating image data in a packet via the network, said apparatus comprising:

measuring means for measuring an amount of traffic via the network at a predetermined timing, the traffic being measured in relation to a size of an image represented by the image data;

compression means for compressing the image data in the packet to be communicated in accordance with a result of the measurement of said measuring means without changing a size of the packet; and communication means for communicating the image data compressed by said compression means in the packet.

2. An apparatus according to claim 1, wherein, when the result of measurment of said measuring means is greater than a predetermined value, said compression means compresses the image data to be communicated.

3. An apparatus according to claim 1, wherein, when the result of measurment of said measuring means is greater than a predetermined value, said compression means changes a compression method of the image data to be communicated.

4. An apparatus according to claim 2, wherein said communication means communicates the image data by adding information indicating that the communicated image data comprises compressed data thereto.

5. An apparatus according to claim 3, wherein said communication means communicates the image data by adding information indicating that the communicated image data comprises data compressed by the changed compression method thereto.

6. An apparatus according to claim 5, wherein said communication means communicates the image data by adding an expansion program for the compressed data thereto.

7. A communication method for communicating image data in a packet via a network, to which a communication apparatus is connected, said method comprising the steps of:

measuring means for measuring an amount of traffic via the network at a predetermined timing, the traffic being measured in relation to a size of an image represented by the image data;

compressing the image data in the packet to be communicated in accordance with a result of the measurement in said measuring step without changing a size of the packet; and communicating the image data compressed in said compression step in the packet.

8. A method according to claim 7, wherein, when the result of measurement of said measuring step is greater than a predetermined value, said compression step compresses the image data to be communicated.

9. A method according to claim 7, wherein, when the result of measurement of said measuring step is greater than a predetermined value, said compression step changes a compression method of the image data to be communicated.

10. A method according to claim 8, wherein said communication step communicates the image data by adding information indicating that the communicated image data comprises compressed data thereto.

11. A method according to claim 9, wherein said communication step communicates the image data by adding information indicating that the communicated image data comprises data compressed by the changed compression method thereto.

12. A method according to claim 11, wherein said communication step communicates the image data by adding an expansion program for the compressed data thereto.

* * * * *

UNITED STATES PATENT AND TRADEMARK OFFICE
CERTIFICATE OF CORRECTION

PATENT NO. : 5,761,438

DATED : June 2, 1998

INVENTOR(S): AKITOMO SASAKI

It is certified that error appears in the above-identified patent and that said Letters Patent is hereby corrected as shown below:

COLUMN 6

Line 51, "onedimensionally" should read
--one-dimensionally--.

COLUMN 7

Line 61, "movingpicture" should read --moving picture--.

COLUMN 16

Line 1, "measuring means for" should be deleted.

Signed and Sealed this

Twenty-fifth Day of May, 1999

Attest:

Q. TODD DICKINSON

Attesting Officer

Acting Commissioner of Patents and Trademarks